(12) United States Patent
Tallet

(10) Patent No.: US 8,885,486 B2
(45) Date of Patent: Nov. 11, 2014

(54) DETECTING AND MITIGATING DATA PLANE BRIDGING LOOPS

(75) Inventor: Francois Tallet, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1142 days.

(21) Appl. No.: 12/415,122

(22) Filed: Mar. 31, 2009

(65) Prior Publication Data

US 2010/0246410 A1    Sep. 30, 2010

(51) Int. Cl.
*H04L 12/26* (2006.01)
*H04L 12/46* (2006.01)

(52) U.S. Cl.
CPC .............. *H04L 12/462* (2013.01); *H04L 43/12* (2013.01); *H04L 12/4641* (2013.01)
USPC .......................................... 370/248; 709/203

(58) Field of Classification Search
CPC ........... B65H 2220/01; B65H 2220/02; B65H 2513/53; B65H 2220/03; B82Y 35/00; B82Y 10/00; G01Q 10/065; G01Q 40/00; G01Q 10/06; G01Q 60/54; G01Q 70/02; G01R 29/0814; G01R 29/0871; G01R 29/0878; G01R 33/50; G07C 5/008; G08B 31/00; G08B 25/00; H04L 12/2801; H04L 12/2861; H04L 12/462; H04L 12/4641; H04L 2209/56; H04L 2209/80; H04L 27/364; H04L 43/12; H04L 63/0823; H04L 63/107; H04L 63/1441; H04L 63/1466; H04L 63/18; H04L 67/12; H04L 9/3215; H04L 9/3263; H04L 9/3273; H04Q 1/145; H04Q 11/0005; H04Q 11/0066; H04Q 2011/003; H04Q 2011/0039; H04Q 2100/0043; H04Q 2011/0064; H04Q 2011/0083; H04Q 2011/0088; A61M 2205/70; A61M 2209/02; B05B 11/0037; G06F 17/505; H01H 2071/044; H01H 71/04; H01H 73/44; H01Q 3/267; H01Q 7/00; H02H 9/005; H02K 11/001; H03C 3/406
USPC ......... 370/214, 242, 244, 245, 248, 249, 250; 709/203
See application file for complete search history.

(56) References Cited

U.S. PATENT DOCUMENTS

| | | | |
|---|---|---|---|
| 2005/0108416 A1* | 5/2005 | Khosravi et al. | 709/232 |
| 2007/0025275 A1 | 2/2007 | Tallet et al. | |
| 2007/0118595 A1* | 5/2007 | Jain et al. | 709/203 |
| 2008/0025203 A1 | 1/2008 | Tallet | |
| 2008/0205302 A1 | 8/2008 | Florit et al. | |
| 2009/0041455 A1* | 2/2009 | Shi et al. | 398/17 |

* cited by examiner

*Primary Examiner* — Yemane Mesfin
*Assistant Examiner* — Mon Cheri Davenport
(74) *Attorney, Agent, or Firm* — Patterson & Sheridan, LLP

(57) ABSTRACT

Example systems and methods associated with detecting bridging loops are described. One example apparatus includes a preliminary detection logic to detect a bridging loop in a switched network based on examining MAC moves reported by a switch in the switched network. The apparatus may also include a confirmation detection logic to confirm the bridging loop by controlling a probe to be sent into the switched network and determining that the probe looped through the switched network. The apparatus may also include a response logic to selectively control switches in the network to break the bridging loop by selectively blocking data plane traffic while allowing control plane traffic.

26 Claims, 7 Drawing Sheets

DETECTING AND MITIGATING DATA PLANE BRIDGING LOOPS

BACKGROUND

Layer two (L2) networks have control protocols to handle redundancy. However, these protocols may not operate as desired and thus allow and/or cause a bridging loop. A loop at L2 in a switched network is a worst case scenario. A bridging loop may cause crippling congestion and other problems. If conventional systems have been able to detect bridging loops they have typically responded by bringing down the entire network and starting over, hoping that whatever caused the loop will be cured by the shutdown and restart.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

BRIEF OVERVIEW

Figure 1:
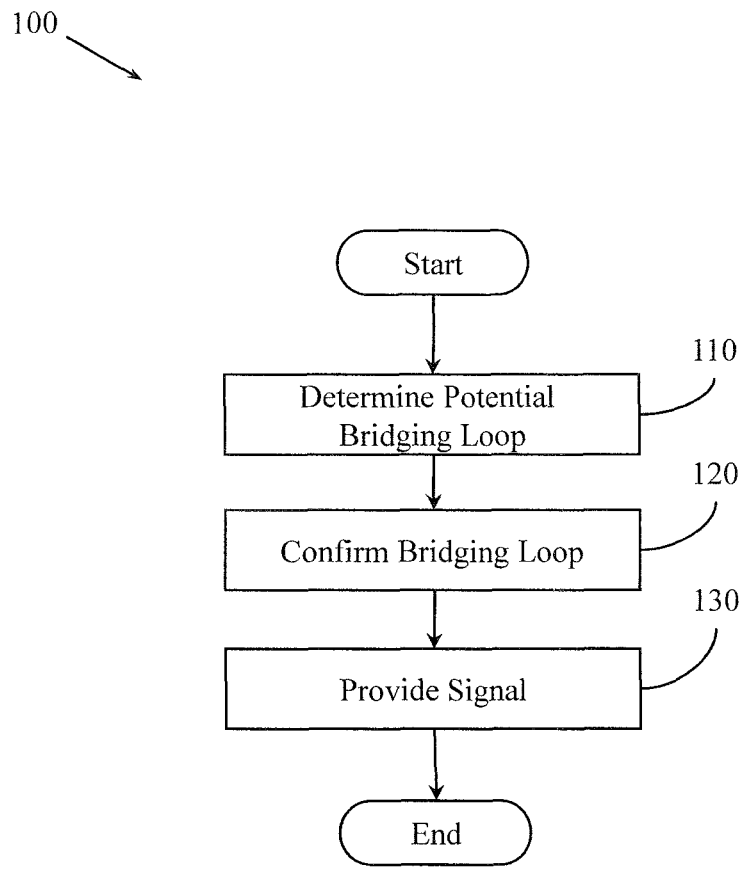
FIG. 1 illustrates an example method associated with detecting a data plane bridging loop.

Example systems and methods detect bridge loops in the data plane with a high rate of success and no false positives. When a loop is detected, the network is put in a state that facilitates confirming that a loop exists and that facilitates mitigating the impact of the loop. Example systems and methods seek to maintain some connectivity while mitigating the loop damage. Thus, example systems and methods perform a hybrid technique that includes a preliminary detection phase and a detection confirmation phase.

Switch monitoring tools can provide indicia that an L2 loop may exist. Media Access Control (MAC) limiting is one switch monitoring tool. MAC limiting can be applied to a switch to set a limit on the number of MAC addresses that can be learned on a single L2 access interface. The limit may be an absolute maximum number of addresses, a list of allowed MAC addresses, and so on. MAC move limiting can be applied to a switch to handle suspect traffic from hosts whose MAC addresses have not been learned by that switch. Handling the suspect traffic may include, for example, blocking the traffic from transiting the switch. A switch may learn initial addresses when hosts send out DHCP requests. The switch may then be programmed to identify and respond to MAC addresses that were not learned during the initial learning. Detecting a number of MAC moves that exceeds a limit for a switch may provide indicia that a bridging loop exists. A switch may be programmed to perform a loop confirmation action after completing the loop suspicion action.

Another switch monitoring tool is MAC move limiting. MAC move limiting can be used to track MAC movements. Recall that when a host moves from one interface to another interface that the host will generally renegotiate its Internet Protocol (IP) address and/or lease. While some MAC movement is to be expected and tolerated, an excess number of MAC movements may also be indicia that a bridging loop exists. Thus, a switch may be programmed to take an action when an undesirable amount of MAC movement is detected. For example, a switch may drop a packet, may log the action (e.g., generate syslog entry), may generate an interrupt, may shut down, may send an alarm, and so on. Additionally, the switch may be configured to perform a loop confirmation action.

Example systems and methods may suspect that there is a bridging loop based on outputs from switch monitoring tools (e.g., MAC limit trigger, MAC move trigger). Upon detecting a suspected bridging loop, example systems and methods may perform a confirmation action to confirm whether the loop exists. The confirmation action may be, for example, a polling action. If the loop is confirmed, example systems and methods may perform a mitigating action. The mitigating action may include, for example, blocking certain ports at the data plane level while allowing certain control plane traffic.

A switch may perform data plane actions and control plane actions. The data plane actions may be performed in hardware while the control plane actions may be performed in software. Data plane messages arriving at a switch may be automatically forwarded through the switch entirely in hardware. Control plane messages arriving at a switch may be received at the hardware level and then passed up into a software layer for control processing.

When the mitigating actions include blocking ports at the data plane level, the mitigating actions may produce a temporary loss of connectivity. This temporary loss of connectivity may be "overkill" initially. However, the initial loss of connectivity may allow time for congestion to clear and may create conditions where ports involved in creating the bridging loop can be more readily detected and corrected. For example, after the initial loss of connectivity, ports may be selectively unblocked in an order that will eventually leave a small (e.g., one) number of ports blocked. In some embodiments, attempts may be made to remove blocks closer to the core of a switched network before removing blocks closer to the edge of a switched network.

The polling action may include sending a number of high priority "probe" frames to pseudorandom MAC addresses at a high rate. In one embodiment, multiple probe frames may be sent out. The probes may be separated by the amount of time it would take for a probe to circulate through the entire network. Multiple probes may be sent to account for probes being lost in the initial congestion caused by the bridging loop.

In one embodiment a probe frame may include data that identifies the probe as a probe. A bridging loop can be confirmed when a probe frame is received at a switch from which it was sent or is received at a port from which it was sent. A pseudorandom MAC address (RMAC) is used instead of a pre-programmed MAC address or purely random MAC address to prevent undesired interactions with existing addresses and to prevent opening the network to a denial of service attacks based on the random MAC address. Switches may be programmed to treat probe messages as control plane traffic. The switches may be programmed to treat probes as control plane traffic for a period of time that is greater than the period of time required for a message to go around the entire network. However, the time during which switches are to treat the probe messages as control plane traffic is limited to prevent undesired side effects including, for example, susceptibility to denial of service attacks.

Data plane messages may be blocked at a low level (e.g., in hardware) upon confirming a bridging loop. Control plane messages may be allowed to continue. Allowing control plane messages to continue facilitates making example systems and methods independent of the protocol employed in the switching network. In one embodiment, switches may be configured to treat probe packets having the pseudorandom address as control plane packets. Therefore the control plane "probes" can transit the network even while data plane traffic is blocked. Blocking data plane messages reduces connectivity in the network. However, reducing connectivity may allow congestion to clear. While connectivity is reduced, it is not eliminated as in some conventional approaches. A network may be split in two or more pieces, and connectivity may be maintained within the pieces. As mitigation continues, more pieces may be reconnected thereby limiting the impact of reducing connectivity. Once again, given the alternative of complete loss of connectivity, reduced connectivity provides an improvement over conventional systems.

Once the bridging loop is confirmed, some switches may continue to send out probes to determine whether the loop still exists and to determine when to cease their blocking actions. A switch may determine that the loop persists so long as a probe message is returned to the switch within a threshold period of time. Once probes are no longer returned to the switch, the switch may determine that the loop is broken. Upon determining that the loop is broken, the switch may return to normal operations where data plane messages are no longer blocked. However, before returning to normal operations, just to be safe, the switch may wait a random, configurable period of time long enough to allow a probe message to transit the entire network. The switch may also wait an additional, configurable period of time to prevent multiple switches from returning to normal operations all at the same time.

More than one switch may have detected the potential bridging loop and thus more than one switch may be attempting to confirm and/or mitigate the problem. Therefore switches may be configured to perform a backing off process to limit duplication in problem detection and/or mitigation. In one example, switches that are acting to detect and mitigate may operate according to random timers. Devices closer to the core of a switched network may have shorter timers than devices closer to the edge of a switched network. As devices detect, mitigate, and back off, a minimum number of ports are to be left blocked. Example systems and methods aim to leave blocked the ports or single port involved in creating the bridging loop. Blocking this port(s) may break the loop and/or mitigate damage caused by the loop.

An example method includes a first portion that detects a potential bridging loop as a function of tracking MAC moves. Recall that an event may be generated when a MAC address is learned on several different ports in a short period of time. The first portion of the method may include identifying a first virtual local area network (VLAN) on which a suspicious MAC move occurs.

The example method includes a second portion that confirms whether the potential bridging loop is an actual bridging loop. The second portion includes generating a pseudo-random MAC (RMAC) that a contains an unknown but predictable portion that identifies the RMAC as a probe. The forwarding ports for the VLAN are programmed to redirect packets having the RMAC to the control plane. The forwarding ports are redirected for a period of time longer than the time it takes for a packet to transit the switched network. A series of high priority probes are then sent with the destination address set to the RMAC. If a forwarding port receives a probe that it sent, then the method can confirm that there is a bridging loop. In one embodiment, the bridging loop will not be confirmed until two or more probes are received.

Example methods may include a third phase where attempts are made to mitigate issues created by the bridging loop. In one example, data plane traffic on affected ports for an affected VLAN are blocked by lower level (e.g., hardware) mechanisms. Control plane traffic continues to flow and is used to determine when the bridging loop has been cleared and/or isolated. While the bridging loop remains, switches with blocked ports may be controlled to send out additional probes. The additional probes may have different RMACs. Sending out the additional probes facilitates maintaining links associated with the switch and prevents L2 reconfiguration on the switch. Additional probes may be sent out at different rates based on how close to the edge of the network the switch is located. When a probe is received that indicates that the bridging loop persists, a switch may start a timer and wait a period of time before sending another probe. Once again the timer may be longer for edge switches than core switch timers.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates an example method 100. Method 100 includes, at 110, determining that a bridging loop potentially exists in a switched networked. A switched network has switches. The switches process data messages in a data plane and process control messages in a control plane. The data plane may be implemented in hardware while the control plane may be implemented in software.

Figure 2:
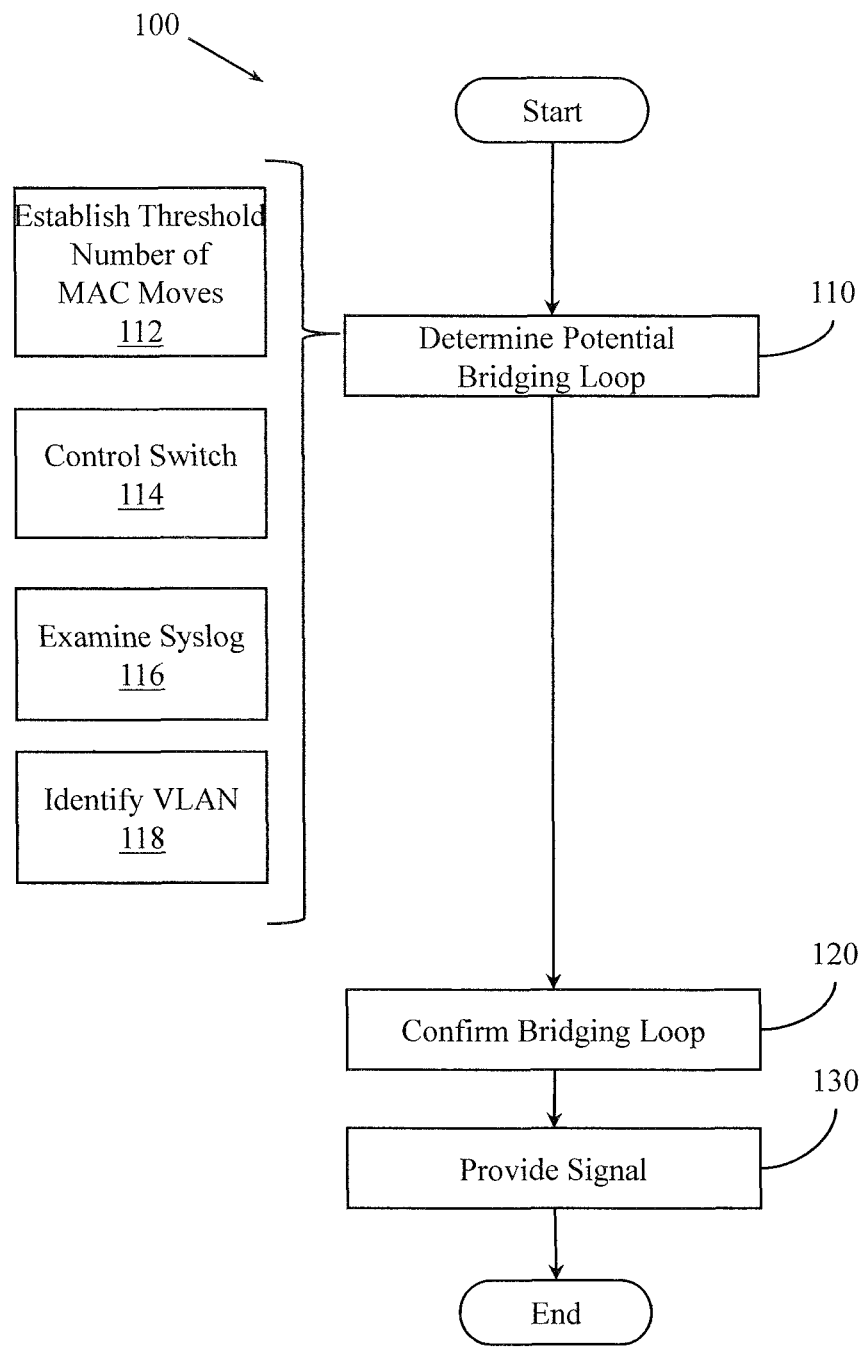
FIG. 2 illustrates another example method associated with detecting a data plane bridging loop.

Method 100 also includes, at 120, confirming that the bridging loop actually exists in the switched networked. As illustrated in FIG. 2, the confirming at 120 may include a number of actions. Thus, accurately determining that a bridging loop actually exists, and doing so without false positives, is a two step process that includes different types of actions during the two steps. For example, determining that the bridging loop potentially exists may involve watching MAC moves while determining that the bridging loop actually exists may involve polling the network.

Method 100 also includes, at 130, providing a signal that indicates that the bridging loop exists in the switched network. The signal may control an apparatus and/or another process. For example, the signal may control a switch to selectively block ports, may control a computer to alert an operator, may control a mitigation process to mitigate issues caused by the bridging loop, and so on. "Signal", as used herein, includes but is not limited to, electrical signals, optical signals, analog signals, digital signals, data, computer instructions, processor instructions, messages, a bit, a bit stream, or other means that can be received, transmitted and/or detected.

While FIG. 1 illustrates various actions occurring in serial, it is to be appreciated that various actions illustrated in FIG. 1 could occur substantially in parallel. By way of illustration, a first process could determine the potential bridging loop, a second process could confirm the bridging loop, and a third process could provide the signal. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a tangible media may store computer executable instructions that if executed by a machine (e.g., processor) cause the machine to perform method 100. While executable instructions associated with the above method are described as being stored on a tangible media, it is to be appreciated that executable instructions associated with other example methods described herein may also be stored on a tangible media.

A "tangible media", as used herein, refers to a medium that stores signals, instructions and/or data. A tangible media may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

FIG. 2 illustrates more detail of one embodiment of method 100. In this embodiment, determining, at 110, that the potential bridging loop exists includes, at 112, establishing a threshold number of MAC moves for the switch. Establishing this threshold facilitates having the switch report that the pre-determined number of MAC moves has occurred. An undesirably high number of MAC moves may provide indicia of a potential bridging loop. In this embodiment of method 100, the determining at 110 includes, at 114, controlling a switch in the switched network to provide a signal upon determining that a pre-determined number of MAC moves have been detected at the switch. Providing the signal may include, for example, generating an interrupt, writing an entry into a system log, and so on. Thus, in one example, the determining at 110 may include determining that the bridging loop potentially exists in the switched network as a function of examining, at 116, an entry written to a system log file by the switch upon detecting a MAC move.

In one embodiment, the determining at 110 may also include, at 118, identifying a virtual local area network (VLAN) associated with the switch and/or with the bridging loop. Identifying a particular VLAN associated with the switch and/or bridging loop facilitates selecting a switch or switches to participate in confirming that a bridging loop exists. Identifying a particular VLAN associated with the switch and/or bridging loop also facilitates selecting a switch or switches to participate in mitigating the effects of the bridging loop.

Figure 3:
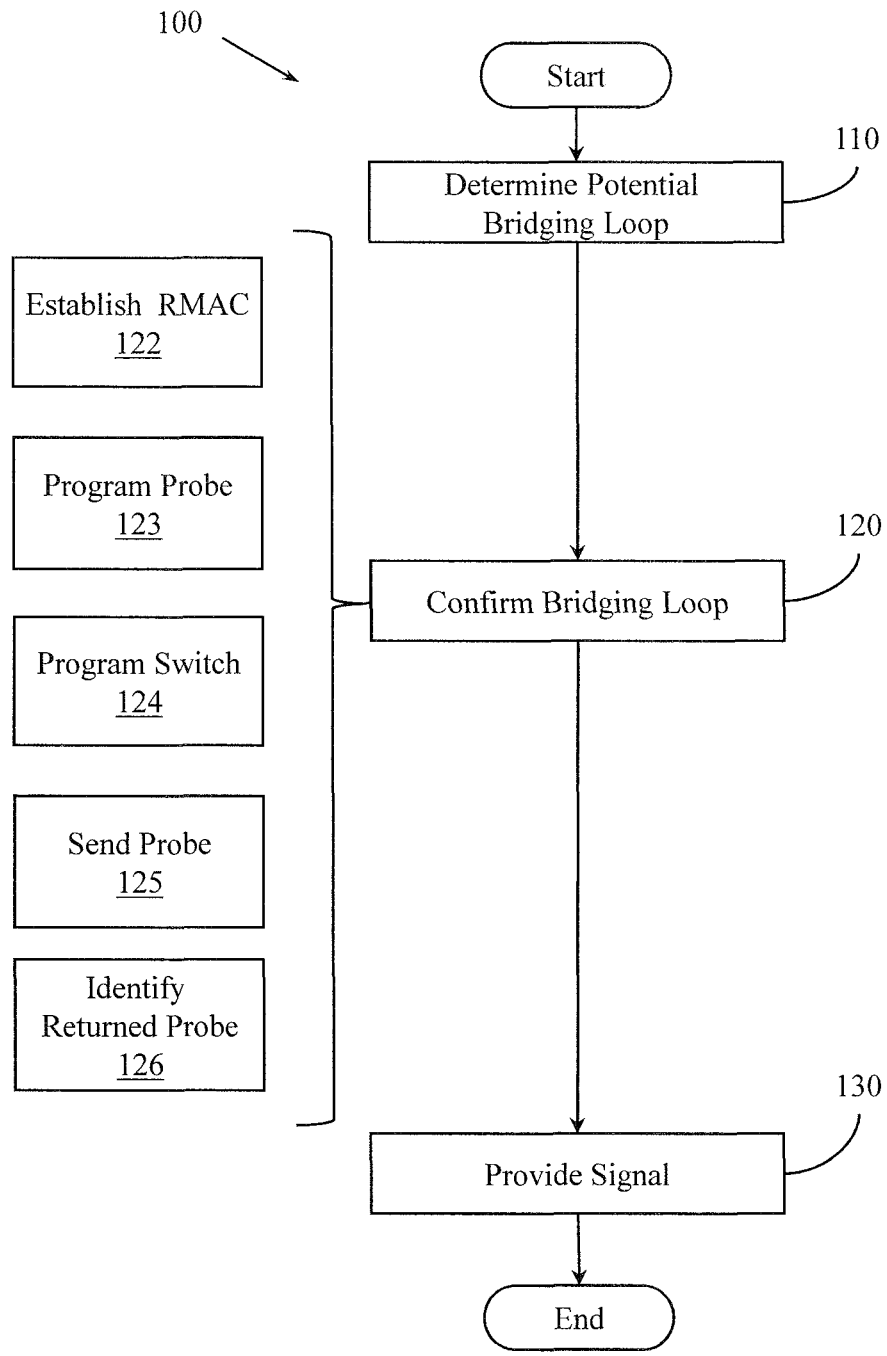
FIG. 3 illustrates another example method associated with detecting a data plane bridging loop.

FIG. 3 illustrates another embodiment of method 100. This embodiment of method 100 includes more detail concerning confirming, at 120, that the bridging loop actually exists. In this embodiment, confirming, at 120, that the bridging loop actually exists includes, at 125, sending a set of probes into the switched network from a sending location and, at 126, identifying that a pre-determined number of probes have returned to the sending location within a pre-determined period of time. In one embodiment, the pre-determined number of probes is one, while in other embodiments the pre-determined number of probes may be, for example, two, three, or more. One skilled in the art will appreciate that the pre-determined period of time will be greater than the message transit time for the switched network. The polling forms the second part of the hybrid approach.

The probes may be carefully crafted to facilitate programming switches to treat probes as control traffic, to prevent exposure to denial of service attacks, and so on. Thus, confirming, at 120, that the bridging loop exists by sending, at 125, the set of probes into the switched network may be preceded by several actions. These actions may include, at 122, establishing a random MAC address. The random MAC address may be both pseudo-random and yet predictable. This facilitates identifying probes and limiting exposure to denial of service attacks. The actions may also include, at 123, programming members of the set of probes with the random MAC address. In one embodiment this may also include programming members of the set of probes with probe-identifying data. The random MAC address and/or the probe-identifying data may facilitate having a switch recognize a probe and handle it as control plane traffic even if data plane traffic is blocked, congested, or otherwise unable to move properly.

The actions may also include, at 124, programming switches in the switched network to treat members of the set of probes as control plane traffic for a period of time. Treating a probe as control plane traffic may include passing the probe up to a software layer in a switch rather than simply forwarding or discarding the probe at a hardware layer.

Probes may be sent into the switched network at a pre-determined rate that balances network traffic with diagnostic relevance. Thus, sending probes into the network may be preceded by establishing a first rate at which members of the set of probes are to be sent into the switched network. In some embodiments described below, actions taken to confirm that a bridging loop still exists may include sending additional probes into the network. These probes may be sent at a second, different (e.g., lower) rate than the initial diagnostic probes.

Figure 4:
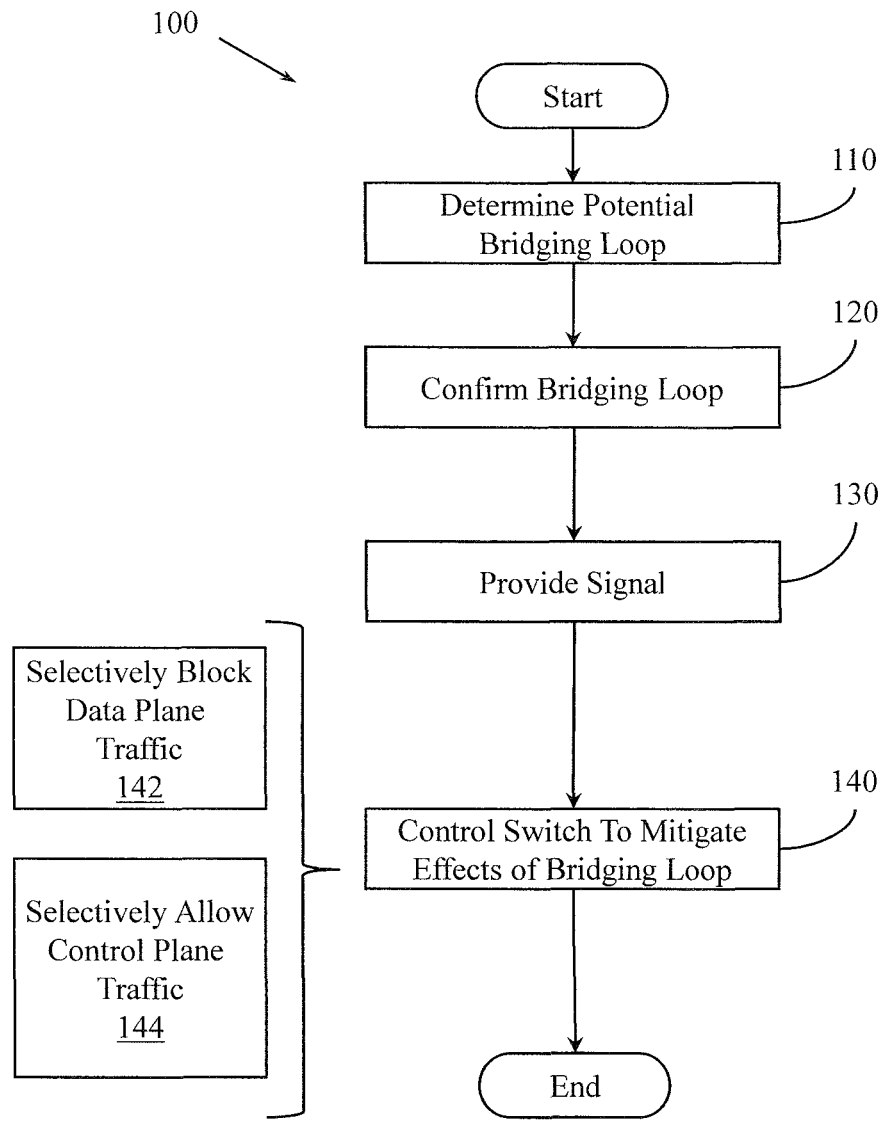
FIG. 4 illustrates an example method associated with detecting and mitigating a data plane bridging loop.
Figure 5:
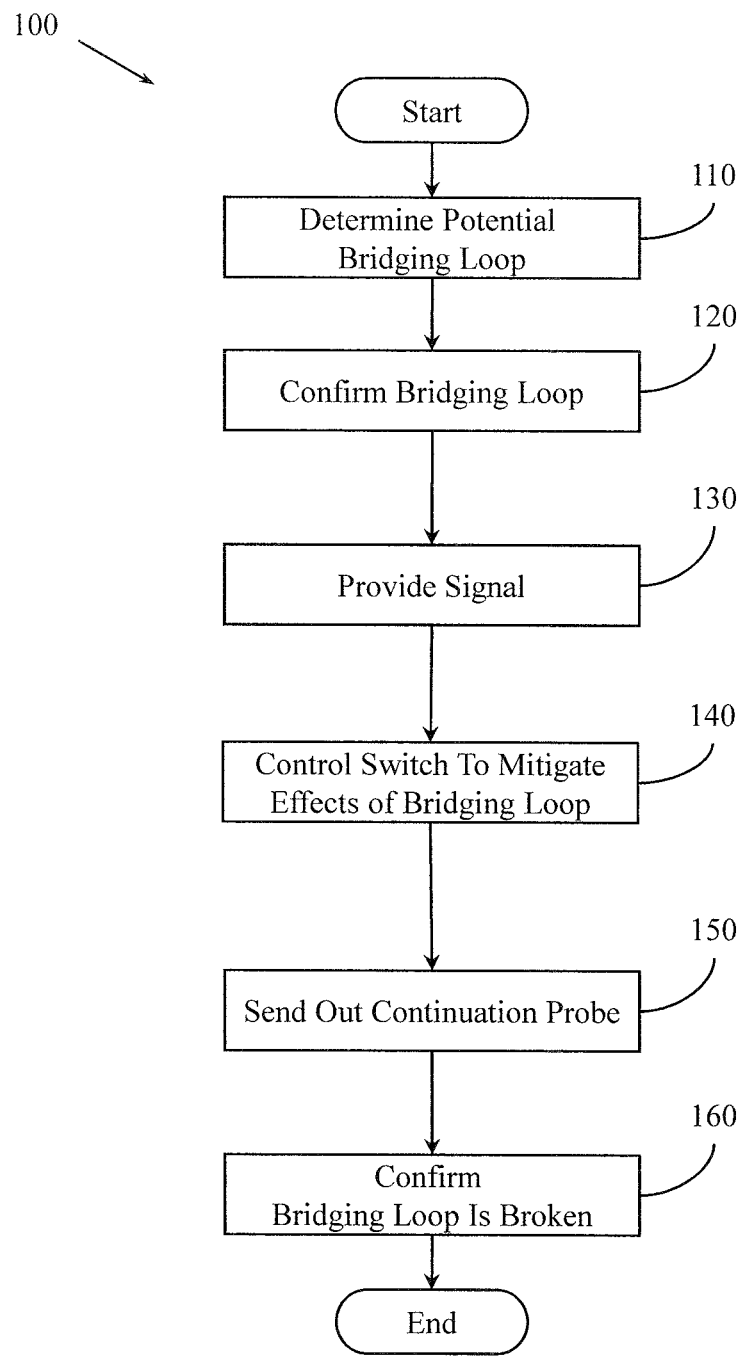
FIG. 5 illustrates another example method associated with detecting and mitigating a data plane bridging loop.

FIG. 4 illustrates another embodiment of method 100. This embodiment of method 100 includes, at 140, controlling a switch to mitigate an effect of the bridging loop. Controlling the switch, at 140, to mitigate the effect of the bridging loop may include, at 142, controlling the switch to selectively block data plane traffic and, at 144, controlling the switch to forward control plane traffic. A switch may be controlled to block data plane traffic for a pre-determined period of time. After that period of time has expired, a decision may be made about whether to control the switch to continue blocking data plane traffic for an additional period of time. This decision may depend on whether the bridging loop has been broken. FIG. 5 illustrates how the bridging loop broken decision may be made.

Blocking data plane traffic at 142 facilitates alleviating congestion in a network. This may allow control plane traffic, including probes, to transit the network for diagnostic and mitigation purposes. Allowing control plane traffic at 144 facilitates maintaining links and thus prevents additional L2 configuration actions from being taken. Both of these actions provide improvements over conventional single step detection methods that simply shut down a network upon detecting a bridging loop.

FIG. 5 illustrates another embodiment of method 100. This embodiment of method 100 includes, at 150, sending a continuation probe into the switched network from a sending location and, at 160, confirming that the bridging loop has been broken. Confirming that the bridging loop has been broken occurs upon determining that the continuation probe sent at 150 has not returned to the sending location within a second pre-determined period of time. This pre-determined period of time will be at least as long as the time it would take to transit the network.

Multiple switches may have determined that there was a potential bridging loop and thus multiple switches may have taken actions to confirm the bridging loop and/or to mitigate the bridging loop. Therefore, different switches may be programmed differently with respect to how often continuation probes are provided and with respect to backing out of the blocking actions. In one embodiment, different switches in the switched network are programmed to send probes at different points in time as a function of the switch location in the switched network. For example, a switch located closer to the core of the switched network may be programmed with a shorter time period than a switch located closer to the edge of the switched network.

Once the confirmation has been made at 160, then method 100 may include selectively controlling switches to once again forward data plane traffic.

Figure 6:
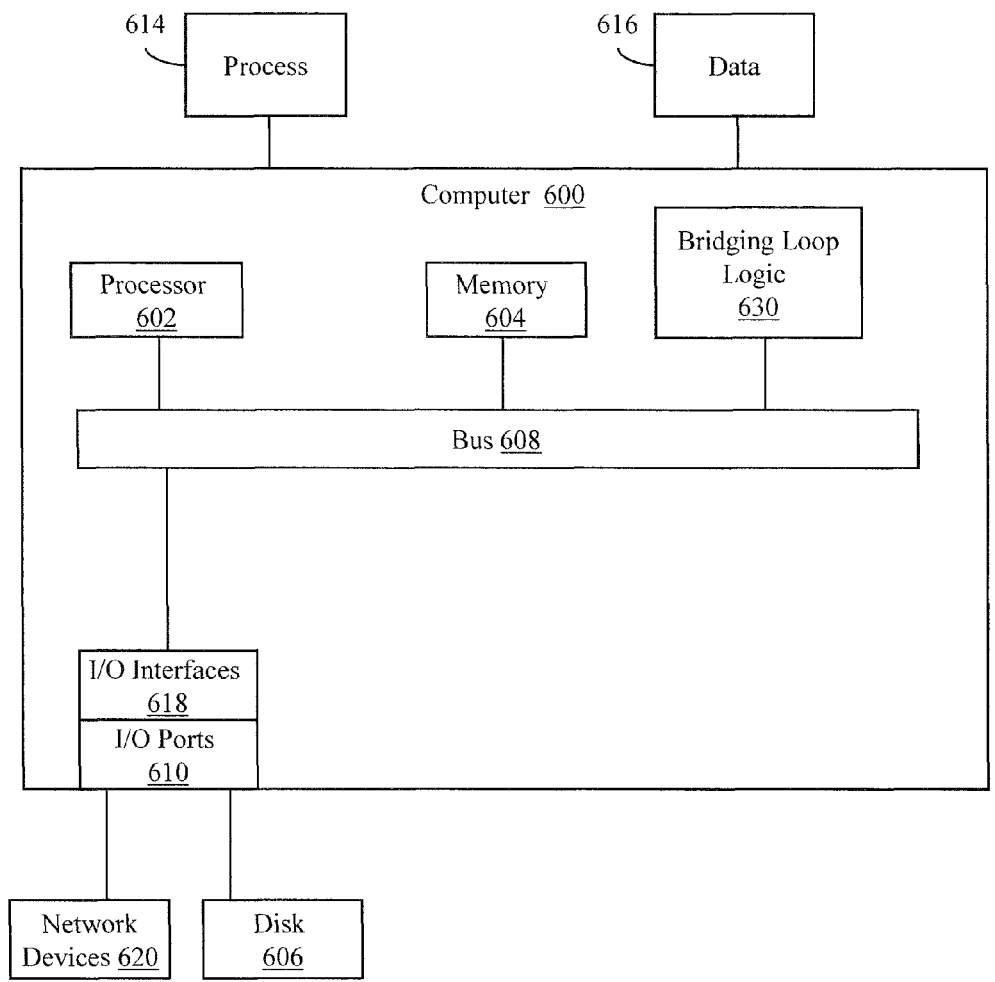
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a bridging loop logic 630 configured to facilitate detecting and mitigating bridging loops. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software, firmware) for identifying a suspicion that a bridging loop exists in a switched network. Logic 630 may also provide means (e.g., hardware, software, firmware) for confirming the suspicion that the bridging loop exists in the switched network with an accuracy of more than 95% and with zero false positives. Logic 630 may also provide means (e.g., hardware, software, firmware) for reducing connectivity in the switched network as a function of confirming the suspicion. Thus, logic 630 may facilitate detecting and responding to a bridging loop. Since actions may be taken to mitigate the bridging loop, in one example logic 630 may also provide means (e.g., hardware, software, firmware) for determining that the bridging loop has been broken in the switched network and for increasing connectivity in the switched network as a function of determining that the bridging loop has been broken.

The means associated with logic 630 may be implemented, for example, as an ASIC programmed to detect and mitigate bridging loops. The means may also be implemented as computer executable instructions (e.g., software) that are presented to computer 600 as data 616 that are temporarily stored in memory 604 and then executed by processor 602. "Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on. While a computer 600 is illustrated, bridging loop logic 630 may reside in networking devices including, for example, a router, a switch, a gateway, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM drive, a Blu-Ray drive, an HD-DVD drive, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Figure 7:
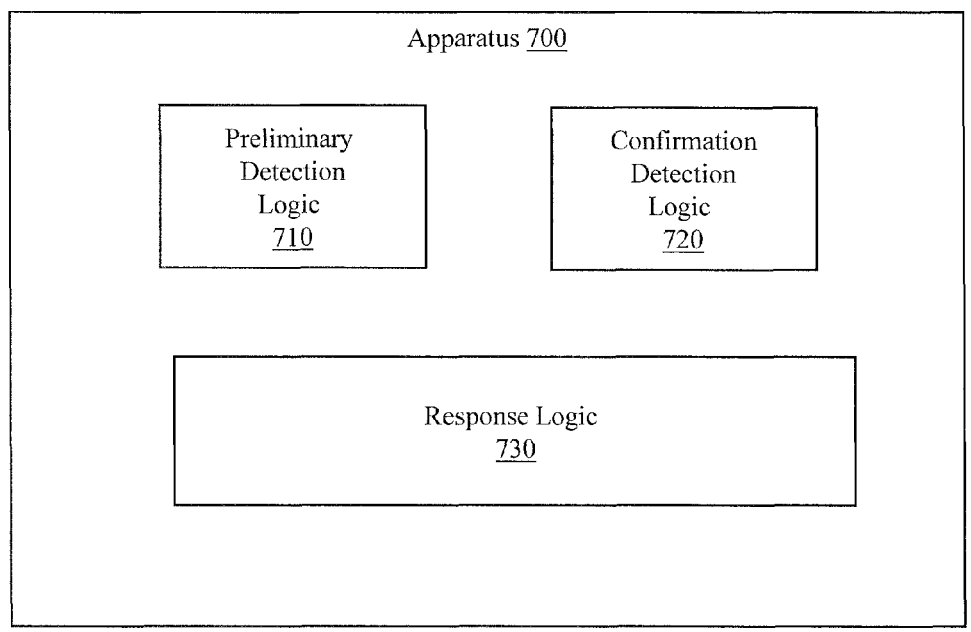
FIG. 7 illustrates an example apparatus associated with detecting a data plane bridging loop.

FIG. 7 illustrates an example apparatus 700 associated with detecting a data plane bridging loop. Apparatus 700 may include a preliminary detection logic 710. Preliminary detection logic 710 may be configured to detect a bridging loop in a switched network. In one embodiment, detecting the bridging loop may be based, at least in part, on examining MAC moves reported by a switch in the switched network. For example, the preliminary detection logic 710 may be configured to detect a bridging loop as a function of the number of MAC moves reported by a switch in the switched network in a period of time.

Apparatus 700 also includes a confirmation detection logic 720. Confirmation detection logic 720 is configured to confirm the bridging loop in the switched network. In one example, confirmation detection logic 720 confirms the bridging loop by controlling a probe to be sent into the switched network and then determining that the probe looped through the switched network. If the probe went out and came back to the same place, then there is a bridging loop.

Probes may be specifically crafted to facilitate identification and to minimize exposure to denial of service attacks. Confirmation detection logic 720 may, therefore, be configured to program a probe with a pseudo-random MAC address. Since confirmation detection logic 720 knows how it programmed the probes, confirmation detection logic 720 can also program switches in the switched network to treat a probe programmed with the pseudo-random MAC address as control plane traffic. Having crafted the probes and set up the switches, confirmation detection logic 720 can then send the probe or a set of probes into the switched network and identify that the probe looped through the switched network within a pre-determined period of time. If the probe returned within a pre-determined period of time, then the bridging loop is confirmed and apparatus 700 may seek to perform mitigating actions.

Therefore apparatus 700 also includes a response logic 730. Response logic 730 is configured to selectively control a switch or switches in the switched network to break the bridging loop. In one example, breaking the bridging loop includes controlling a switch or switches to selectively block data plane traffic while allowing control plane traffic. In one embodiment, the response logic 730 is configured to periodically send additional probes into the switched network. The continuation probes will either confirm that the bridging loop still exists or identify that the bridging loop has been broken. Therefore, the response logic 730 is configured to selectively re-establish connectivity in switches in the switched network upon determining that an additional probe did not loop through the switched network within a second pre-determined period of time. Selectively re-establishing connectivity includes controlling switches to resume forwarding data plane traffic. To prevent a number of switches from simultaneously resuming forwarding data plane traffic, different switches may be programmed to resumed at different, potentially random, points in time.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. Logic encoded in one or more non-transitory media for execution and when executed operable to perform an operation, the operation comprising:

identifying an indicator that a bridging loop potentially exists in a switched networked, where the switched network includes two or more switches, where a switch processes data messages in a data plane and processes control messages in a control plane;

upon identifying the indicator of a bridging loop, confirming that the bridging loop actually exists in the switched networked by sending a set of probes into the switched network from a sending location and programming switches in the switched network to treat members of the set of probes as control plane traffic for a time period T1; and providing a signal that indicates that the bridging loop exists in the switched network.

2. The logic of claim 1, where identifying the indicator that the bridging loop potentially exists in the switched network comprises:

controlling a switch in the switched network to provide a signal upon determining that a pre-determined number of Media Access Control (MAC) moves have been detected at the switch in a time period T2, wherein a MAC move is a host renegotiating an Internet Protocol (IP) address or lease with the switch.

3. The logic of claim 2, where controlling the switch in the switched network to provide the signal upon determining that the pre-determined number of MAC moves have been detected at the switch comprises establishing a threshold number of MAC moves for the switch.

4. The logic of claim 3, where identifying the indicator that the bridging loop potentially exists in the switched network comprises determining that a pre-determined number of MAC moves have been detected at the switch based, at least in part, on examining an entry written to a system log file by the switch upon detecting a MAC move.

5. The logic of claim 2, where identifying the indicator that the bridging loop potentially exists in the switched network comprises:

identifying a virtual local area network (VLAN) associated with the switch.

6. The logic of claim 2, where identifying the indicator that the bridging loop potentially exists in the switched network comprises:

identifying a virtual local area network (VLAN) associated with the bridging loop.

7. The logic of claim 1, where confirming that the bridging loop actually exists in the switched network comprises identifying that a pre-determined number of probes have returned to the sending location within a pre-determined time period T3.

8. The logic of claim 7, where sending the set of probes into the switched network from the sending location comprises:

establishing a random MAC address; and
programming members of the set of probes with the random MAC address.

9. The logic of claim 8, where the pre-determined number of probes is one.

10. The logic of claim 8, where the pre-determined number of probes is two.

11. The logic of claim 8, where the pre-determined time period T3 is greater than the message transit time for the switched network.

12. The logic of claim 8, where the random MAC address is pseudo-random and predictable.

13. The logic of claim 7, where sending the set of probes into the switched network from the sending location comprises:

programming members of the set of probes with probe-identifying data.

14. The logic of claim 7, where sending the set of probes into the switched network from the sending location comprises:

establishing a first rate at which members of the set of probes are to be sent into the switched network.

15. The logic of claim 1, the method comprising:

controlling a switch to mitigate a bridging loop effect.

16. The logic of claim 15, where controlling the switch to mitigate the bridging loop effect comprises:

controlling the switch to selectively block data plane traffic; and
controlling the switch to forward control plane traffic.

17. The logic of claim 16, the method comprising:

sending a continuation probe into the switched network from a sending location; and
confirming that the bridging loop has been broken upon determining that the continuation probe has not returned to the sending location within a pre-determined time period T4.

18. The logic of claim 17, the method comprising:

selectively controlling the switch to forward data plane traffic upon determining that the continuation probe has not returned to the sending location within the pre-determined time period T4.

19. The logic of claim 18, the method comprising programming different switches in the switched network with different pre-determined time periods T4 as a function of the switch location in the switched network.

20. The logic of claim 19, where programming different switches as a function of the switch location comprises programming a switch located closer to the core of the switched network with a pre-determined time period T4 shorter than a switch located closer to the edge of the switched network.

21. An apparatus, comprising:

a preliminary detection logic configured to detect, by operation of one or more computer processors, a preliminary indicator of a bridging loop in a switched network based, at least in part, on examining Media Access Control (MAC) moves reported by a switch in the switched network;

a confirmation detection logic configured to, upon detecting the preliminary indicator of a bridging loop, confirm an existence of the bridging loop in the switched network by controlling a probe to be sent into the switched network and determining that the probe looped through the switched network, wherein at least one switch in the switched network is programmed to treat the probe as control plane traffic; and a response logic configured to selectively control one or more switches in the switched network to break the bridging loop, where breaking the bridging loop comprises controlling one or more switches to selectively block data plane traffic while allowing control plane traffic.

22. The apparatus of claim 21, where the preliminary detection logic is configured to detect a bridging loop as a function of the number of MAC moves reported by a switch in the switched network in a time period, wherein a MAC move is a host renegotiating an Internet Protocol (IP) address or lease with the switch.

23. The apparatus of claim 22, where the confirmation detection logic is configured to:

program a probe with a pseudo-random MAC address;

program switches in the switched network to treat a probe programmed with the pseudo-random MAC address as control plane traffic;

send the probe into the switched network; and identify that the probe looped through the switched network within a pre-determined time period.

24. The apparatus of claim 22, where the response logic is configured to periodically send additional probes into the switched network and to selectively re-establish connectivity in one or more switches in the switched network upon determining that an additional probe did not loop through the switched network within a second pre-determined time period, where selectively re-establishing connectivity comprises controlling one or more switches to resume forwarding data plane traffic.

25. A system, comprising:

means for identifying a suspicion that a bridging loop potentially exists in a switched network;

means for, upon identifying the suspicion, confirming the suspicion that the bridging loop exists in the switched network with an accuracy of more than 95% and with zero false positives by sending a set of probes into the switched network from a sending location and programming at least one switch in the switched network to treat members of the set of probes as control plane traffic in the switch network; and means for reducing connectivity in the switched network as a function of confirming the suspicion.

26. The system of claim 25, comprising:

means for determining that the bridging loop has been broken in the switched network; and means for increasing connectivity in the switched network as a function of determining that the bridging loop has been broken.

* * * * *

UNITED STATES PATENT AND TRADEMARK OFFICE
CERTIFICATE OF CORRECTION

Page 1 of 1

PATENT NO. : 8,885,486 B2
APPLICATION NO. : 12/415122
DATED : November 11, 2014
INVENTOR(S) : Tallet It is certified that error appears in the above-identified patent and that said Letters Patent is hereby corrected as shown below:

In the Specification:

Column 10, Line 26, please delete "resumed" and insert --resume-- therefor;

In the Claims:

Column 11, Claim 1, Line 8, please delete "networked" and insert --network-- therefor;

Column 12, Claim 15, Line 8, please delete "method" and insert --operation-- therefor;

Column 12, Claim 17, Line 15, please delete "method" and insert --operation-- therefor;

Column 12, Claim 18, Line 23, please delete "method" and insert --operation-- therefor;

Column 12, Claim 19, Line 28, please delete "method" and insert --operation-- therefor.

Signed and Sealed this
Twenty-eighth Day of April, 2015

Michelle K. Lee
*Director of the United States Patent and Trademark Office*